(12) United States Patent
Kajigano

(10) Patent No.: US 6,842,417 B1
(45) Date of Patent: Jan. 11, 2005

(54) AUDIO SYSTEM

(75) Inventor: Toshiyuki Kajigano, Fukushima (JP)

(73) Assignee: Denon, Ltd., Tokyo (JP)

( * ) Notice: Subject to any disclaimer, the term of this patent is extended or adjusted under 35 U.S.C. 154(b) by 945 days.

(21) Appl. No.: 09/662,748

(22) Filed: Sep. 15, 2000

(30) Foreign Application Priority Data

Sep. 17, 1999 (JP) .......................................... 11-263953

(51) Int. Cl.⁷ .............................. G11B 27/00; H04B 1/20
(52) U.S. Cl. ................................ 369/83; 369/2; 369/14
(58) Field of Search ............................... 369/83, 84, 14, 369/44.11, 30.18, 19, 32.01, 124.01, 30.09, 1, 2, 3; 360/15, 51, 6, 13, 39; 711/100; 704/201, 270

(56) References Cited

U.S. PATENT DOCUMENTS

| 5,029,153 A | * | 7/1991 | Tomoda et al. ............... 369/83 |
| 5,642,492 A | * | 6/1997 | Iizuka ......................... 711/100 |
| 6,285,634 B1 | * | 9/2001 | Abe et al. ................ 369/44.11 |

FOREIGN PATENT DOCUMENTS

| EP | 0276143 | 7/1988 |
| EP | 0306008 | 3/1989 |
| GB | 2340293 | 2/2000 |
| JP | 58161189 | 9/1983 |
| JP | 01128285 | 5/1989 |
| JP | 04113573 | 4/1992 |
| JP | 5-159538 | 6/1993 |
| JP | 6-89552 | 3/1994 |
| JP | 8-28100 | 3/1996 |
| JP | 9-171677 | 6/1997 |
| JP | 10-92089 | 4/1998 |
| JP | 11-3556 | 1/1999 |
| JP | 11144443 | 5/1999 |
| JP | 2000105969 | 4/2000 |

* cited by examiner

*Primary Examiner*—Ali Neyzari
(74) *Attorney, Agent, or Firm*—Dickstein Shapiro Morin & Oshinsky LLP

(57) ABSTRACT

Tracks are automatically selected from plural tracks recorded on a CD and are recorded on a MD so that a total reproducing time of the tracks thus selected is within a recordable time of the MD. Upon receiving a notification of the recordable time of the MD 29, a system controller 14 of a CD player 10 selects and reproduces tracks recorded on the CD 19 in accordance with a predetermined priority order so that the total reproducing time of the tracks thus selected does not exceed the recordable time, and has an MD recorder 20 record these tracks.

7 Claims, 8 Drawing Sheets

AUDIO SYSTEM

This application claims a priority based on Japanese Patent Application No. 11-263953 filed on Sep. 17, 2000, the entire contents of which are incorporated herein by reference for all purposes.

BACKGROUND OF THE INVENTION

The present invention relates to a technique in which audio information reproduced from a recording medium serving as a transmission side (source) by an audio reproducing device is recorded on another recording medium serving as a reception side (target) by an audio recording device.

A technique of recording audio information reproduced from a CD (compact disc) by a CD player onto a cassette tape by a tape deck has been known as one of techniques in which audio information reproduced from a recording medium serving as a source by an audio reproducing device is recorded on another recording medium serving as a target by an audio recording device.

For example, according to the technique discloses in Japanese Patent Application Laid-open No. Hei-5-159538, tracks (music pieces, etc.) of audio information recorded on CD are selected and reproduced on the basis of the reproducing time of each of the tracks and the recordable time of a cassette tape designated by a user in a CD player so that the residual recordable time of the cassette tape after the recording operation is minimum, and the respective tracks reproduced by the CD player are recorded on the cassette tape by the tape deck.

SUMMARY OF THE INVENTION

According to the technique of the Japanese Patent. Application Laid-open No. Hei-5-159538, the user must designate the recordable time of the cassette tape to the CD player. Accordingly, when the user wants to record audio information on the cassette tape which has been used until some midpoint thereof, the user must check the recordable time of the unused portion of the cassette tape, and this imposes much labor on the user.

Therefore, a first object of the present invention is to provide an audio system which can automatically select tracks from plural tracks recorded on a recording medium serving as a source without any designation of a residual recordable time from a user and then recorded on another recording medium serving as a target so that the total reproducing time of the tracks thus selected is within a residual recordable time of the other recording medium.

Furthermore, according to the technique disclosed in Japanese Patent Application Laid-open No. Hei-5-159538, the tracks which are reproduced from a recording medium serving as a source and recorded on a recording medium serving as a target are merely determined so that the recordable time of the recording medium serving as the target after the recording operation is minimum. Accordingly, there may occur such a situation that a track which is selected and recorded on the recording medium serving as the target does not match with the user's intention. Under some circumstances, the user wishes to record as many tracks as possible on the recording medium serving as the target. Or, the user wishes to select and record tracks so that the switching frequency of the tracks in the reproducing operation is as small as possible. Further, the user may wish to select tracks in accordance with predetermined priorities.

Therefore, a second object of the present invention is to provide an audio system in which tracks to be recorded on a recording medium serving as a target can be selected from plural tracks recorded on a recording medium serving as a source in order of priority which is determined in view of the using manner of the recording medium serving as the target by the user.

In order to attain the above object, an audio system according to the present invention has an audio reproducing device and an audio recording device, wherein the audio reproducing device reproduces a track serving as an unit of audio information from a recording medium serving as a source mounted on the audio reproducing device as a track to be recorded on a recording medium serving as a target mounted on the audio recording device, and the audio recording device records the track reproduced by the audio reproducing device on the recording medium serving as the target.

The audio recording device comprises calculating means for calculating a recordable time of the recording medium serving as the target, and notifying means for notifying the recordable time calculated by the calculating means to the audio reproducing device, and the audio reproducing device comprises selecting means for selecting the maximum number of tracks from the tracks recorded on the recording medium serving as the source in accordance with the priority order of the tracks settled under a predetermined condition so that a total reproducing time of the selected tracks does not exceed the recordable time notified from the audio recording device, and reproducing means for reproducing the tracks selected by the selection means as tracks to be recorded on the recording medium serving as the target.

According to the present invention, without user's input of a recordable time of a recording medium serving as a target, tracks can be automatically selected from plural tracks recorded on a recording medium serving as a source and recorded on the recording medium serving as the target so that a total reproducing time of the selected tracks is within the recordable time of the recording medium serving as the target.

In the present invention, the priority order of the tracks settled under the predetermined condition may be set in a manner that a track having a shorter reproducing time is given a higher priority, and the selection means selects the maximum number of tracks from the tracks recorded on the recording medium serving as the source so that a total reproducing time of the selected tracks does not exceed the recordable time notified from the audio recording device.

With the above construction, as many tracks as possible can be recorded on the recording medium serving as the target.

DETAILED DESCRIPTION OF THE PREFERRED EMBODIMENTS

Preferred embodiments according to the present invention will be described hereunder with reference to the accompanying drawings.

Now, a first embodiment will be described.

Figure 1:
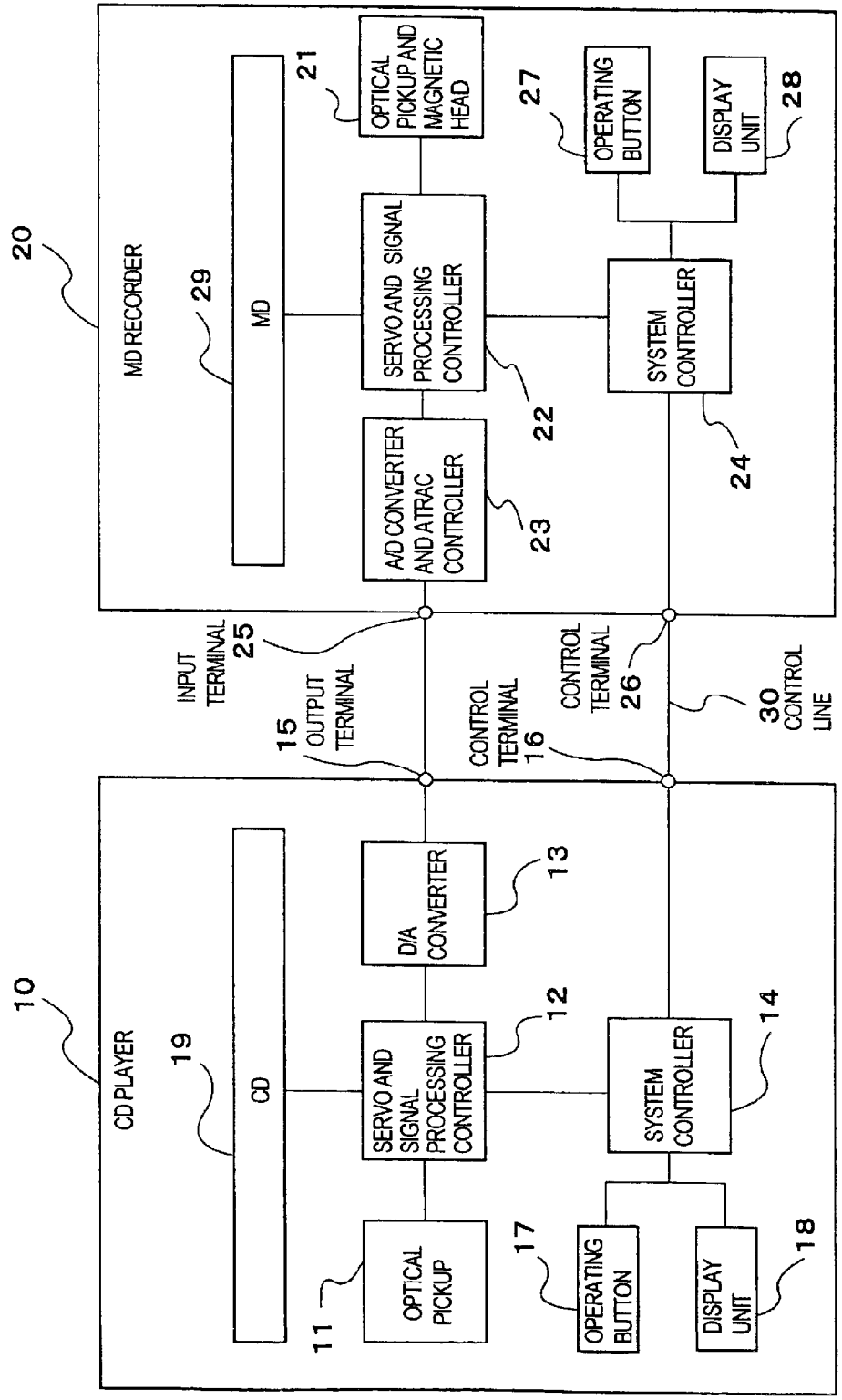
FIG. 1 is a block diagram showing a construction of an audio system according to a first embodiment of the present invention.

FIG. 1 shows a construction of an audio system according to a first embodiment of the present invention.

As shown in FIG. 1, the audio system of the first embodiment of the present invention has a CD player 10 for reproducing audio signals from a CD (compact disc) 19 and an MD recorder 20 for recording audio signals on a MD (mini disc) 29.

In the CD player 10, rotation control of the CD 19 and tracking and focusing control of an optical pickup 11 are performed by a servo and signal processing controller 12 prior to start of a reproducing operation, and the optical pickup 11 reads out TOC (Table Of Contents) information serving as management information containing reproducing time information of each track from a TOC area on the CD 19. The TOC information thus read is processed in the servo and signal processing controller 12 and then transmitted to a system controller 14.

In the reproducing operation, a recording signal read out from the CD 19 by the optical pickup 11 is processed in the servo and signal processing controller 12 to be decoded to an digital audio signal, and to be converted to an analog audio signal in a D/A converter 13 and then the analog audio signal is output from an output terminal 15.

The system controller 14 accepts an user's operation through an operating button 17, and controls the servo and /signal processing controller 12 on the basis of the TOC information, thereby controls the reproduction of each track of the CD 19 as described above. Further, the system controller 14 also controls a display operation of a display unit 18, etc.

In the MD recorder 20, rotation control of the MD 29 and tracking and focusing control of an optical pickup and magnetic head 21 are performed by a servo and signal processing controller 22 prior to start of a recording operation, and the optical pickup and magnetic head 21 reads out UTOC (User's Table Of Contents) information serving as management information containing empty area information on the MD 29 from UTOC on the MD 29. The UTOC information is processed by the servo and signal processing controller 22 and then transmitted to a system controller 24.

In the recording operation, an analog audio signal input from an input terminal 25 connected to the output terminal 15 of the CD player 10 is converted to a digital audio signal in an A/D converter and ATRAC (Adaptive Transform Acoustic Coding) controller 23, subjected to compression processing using ATRAC, and processed by the servo and signal processing controller 22 and then recorded on the MD 29 by the optical pickup and /magnetic head 21.

The system controller 24 accepts a user's operation through an operating button 27, and controls the servo and signal processing controller 22 in accordance with the UTOC information, thereby controls the recording operation of data on the MD 29 as described above. The system controller 24 also controls a display operation of a display unit 28.

In the above construction, the system controller 14 of the CD player 10 and the system controller 24 of the MD recorder 20 mutually receives and transmits control information from and to each other through a control line 30 connecting a control terminal 16 of the CD player 10 and a control terminal 26 of the MD recorder 20 to each other.

Next, there will be described an operation of automatic edition reproducing and recording in which tracks to be recorded on the MD 29 are selected from tracks recorded on the CD 19 and reproduced from the CD 19 so that a total reproducing time of the tracks thus selected does not exceed a recordable time of the MD 29, and are recorded on the MD 29. The operation of automatic edition reproducing and recording will be described hereunder.

Figure 2:
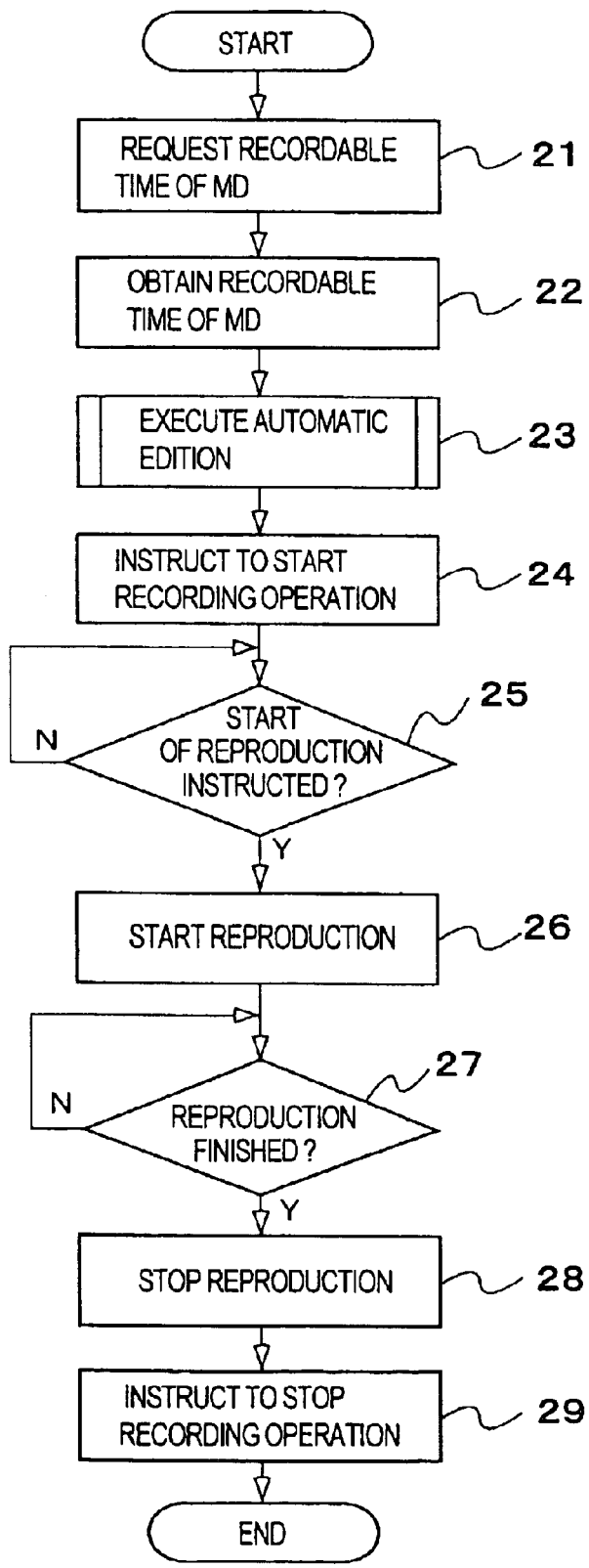
FIG. 2 is a flowchart showing an operation of automatic edition reproducing and recording of a CD player according to the first embodiment of the present invention.
Figure 3:
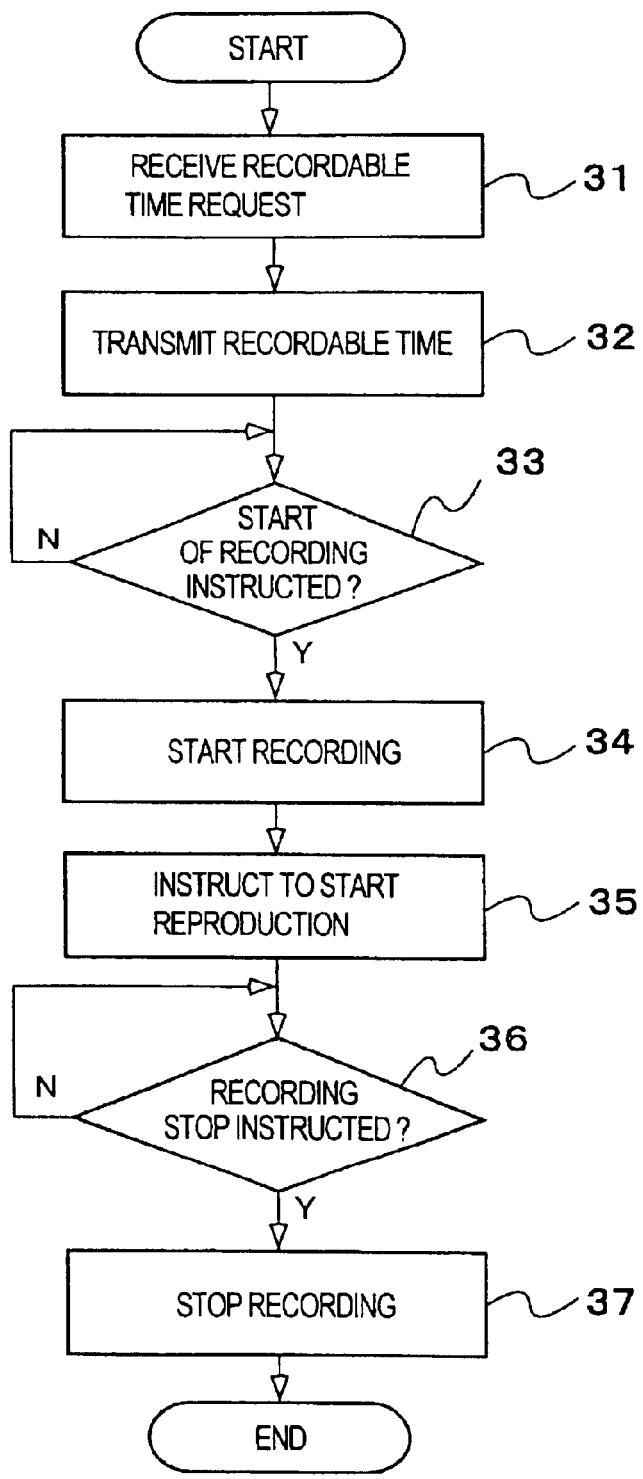
FIG. 3 is a flowchart showing an operation of automatic edition reproducing and recording of an MD recorder according to the first embodiment of the present invention.

A flow of the processing carried out by a system controller 14 of the CD player 10 and a flow of the processing carried out by the system controller 24 of the MD recorder 20 in the operation of the automatic edition reproducing and the recording are shown in FIGS. 2 and 3, respectively.

As shown in FIG. 2, when the system controller 14 of the CD player 10 receives an automatic edition instruction through an operating button 17, it transmits a request signal for inquiring about a recordable time of the MD 29 to the MD recorder 20 through the control line 30 (step 21).

In FIG. 3, when the system controller 24 of the MD recorder 20 receives this request signal (step 31), it calculates the recordable time on the basis of the UTOC information read out from the MD 29, and transmits the recordable time thus calculated to the CD player 10 through the control line 30 (step 32). Thereafter, the system controller 24 waits for a recording start instruction (step 33).

Here, the recordable time can be calculated by the technique disclosed in Japanese Patent Application Laid-open No. Hei-6-89552, for example. That is, the recordable time can be calculated by specifying a block definition information group comprising block definition information indicated by a pointer P-FRA described in a sector 0 of UTOC information and block definition information which is linked to the former block definition information directly or through another block definition information, and then calculating the product of 2.04 seconds and the sum of the numbers of clusters contained in blocks of a section determined by start and end addresses indicated by each block definition information contained in the block definition information group. However, when unrecorded clusters are provided as a guard band, the recordable time is calculated by reducing the number of the unrecorded clusters from the sum of the cluster numbers.

Referring to FIG. 2, when obtaining the recordable time (step 22), the system controller 14 of the CD player 10 carries out the automatic edition processing to create a track reproducing program for recording tracks on the MD 29 (step 23). Here, the track reproducing program defines tracks to be reproduced and the reproducing order of the tracks. In this case, the reproducing program is created so that the total reproducing time of the tracks to be reproduced is within the recordable time. The reproducing program thus created is stored in a memory of the system controller 14. The details of the automatic edition processing will be described later.

Subsequently, the system controller 14 transmits recording start instructions to the MD recorder 20 through the control line 30 (step 24).

In FIG. 3, when the system controller 24 of the MD recorder 20 receives the recording start instructions (step 33), it starts the recording operation (step 34) and also transmits reproducing start instructions to the CD player 10 through the control line 30 (step 35).

Referring to FIG. 2, when the system controller 14 of the CD player 10 receives the reproducing start instructions (step 25), it starts the reproducing operation of the CD 19 in accordance with the reproducing program created in the automatic edition processing at the step 23 (step 26). If the reproducing operation is finished (step 27), the system controller 14 stops the reproducing operation (step 28), and transmit recording stop instructions to the MD recorder 20 through the control line 30 (step 29).

In FIG. 3, when receiving this recording stop instructions (step 36), the system controller 24 of the MD recorder 20 stops the recording operation (step 37).

Through the above processing, the tracks reproduced according to the reproducing program created by the automatic edition processing at the step 23 are recorded on MD 29.

Next, the details of the automatic edition processing at the step 23 will be described.

Figure 4:
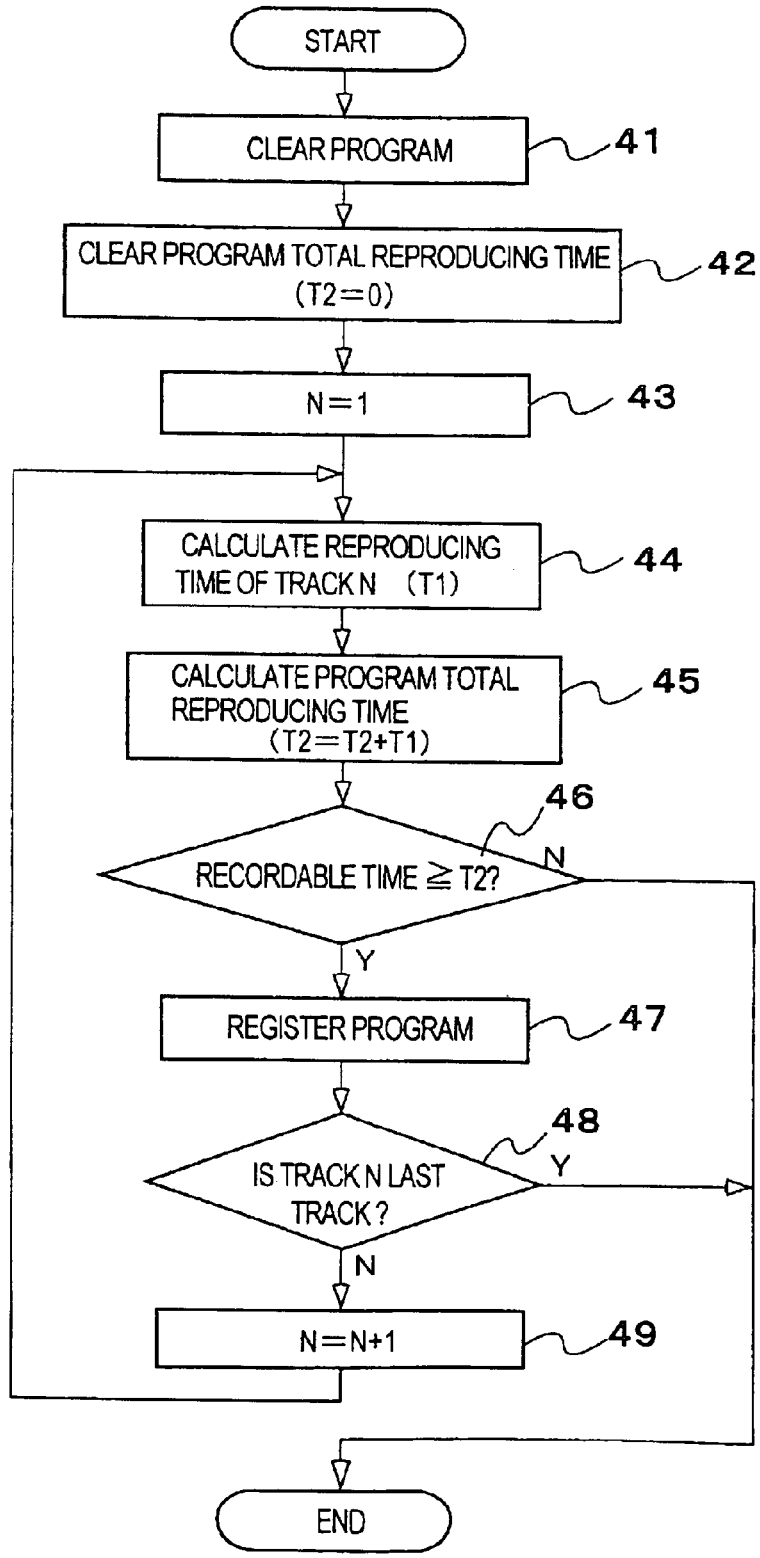
FIG. 4 is a flowchart showing a procedure of automatic edition processing according to the first embodiment of the present invention.

FIG. 4 shows the flow of the automatic edition processing.

In this automatic edition processing, as shown in FIG. 4, the reproducing program of the system controller 14 is first cleared (step 41), and a variable T2 representing the total reproducing time of the reproducing program is initialized to 0 (step 42). Further, a variable N representing a track number which is the turn of a track being noted on the CD 19 is initialized to 1 (step 43).

The reproducing time of the track of the track number N is calculated from the TOC information of the CD 19 and substituted into T1 (step 44), and then T2 is renewed to T2+T1 (step 45). Thereafter, it is checked whether T2 exceeds the recordable time obtained from the MD recorder 20 (step 46). If it does not exceed the recordable time, the track of the track number N is registered in the reproducing program as the N-th track to be reproduced (step 47). If N is not the maximum track number indicating the last track on the CD 19 (step 48), N is incremented by 1 (step 49) and the processing returns to the step 44.

If N is equal to the maximum track number indicating the last track on the CD 19 (step 48) or T2 exceeds the recordable time obtained from the MD recorder 20 (step 46), the processing is finished.

As a result of the above processing, the maximum number of tracks are selected from the tracks recorded on the CD 19 so that the total reproducing time of the tracks thus selected does not exceed the recordable time of the MD 29, and registered in the reproducing program in the order of the track number on CD 19.

Therefore, according to the first embodiment of the present invention, tracks can be automatically selected from plural tracks recorded on the CD 19 and recorded on the MD 29 so that the total time of the tracks selected is within the recordable time of MD 29.

The description on the first embodiment has been just completed.

Next, a second embodiment of the present invention will be described.

Figure 5:
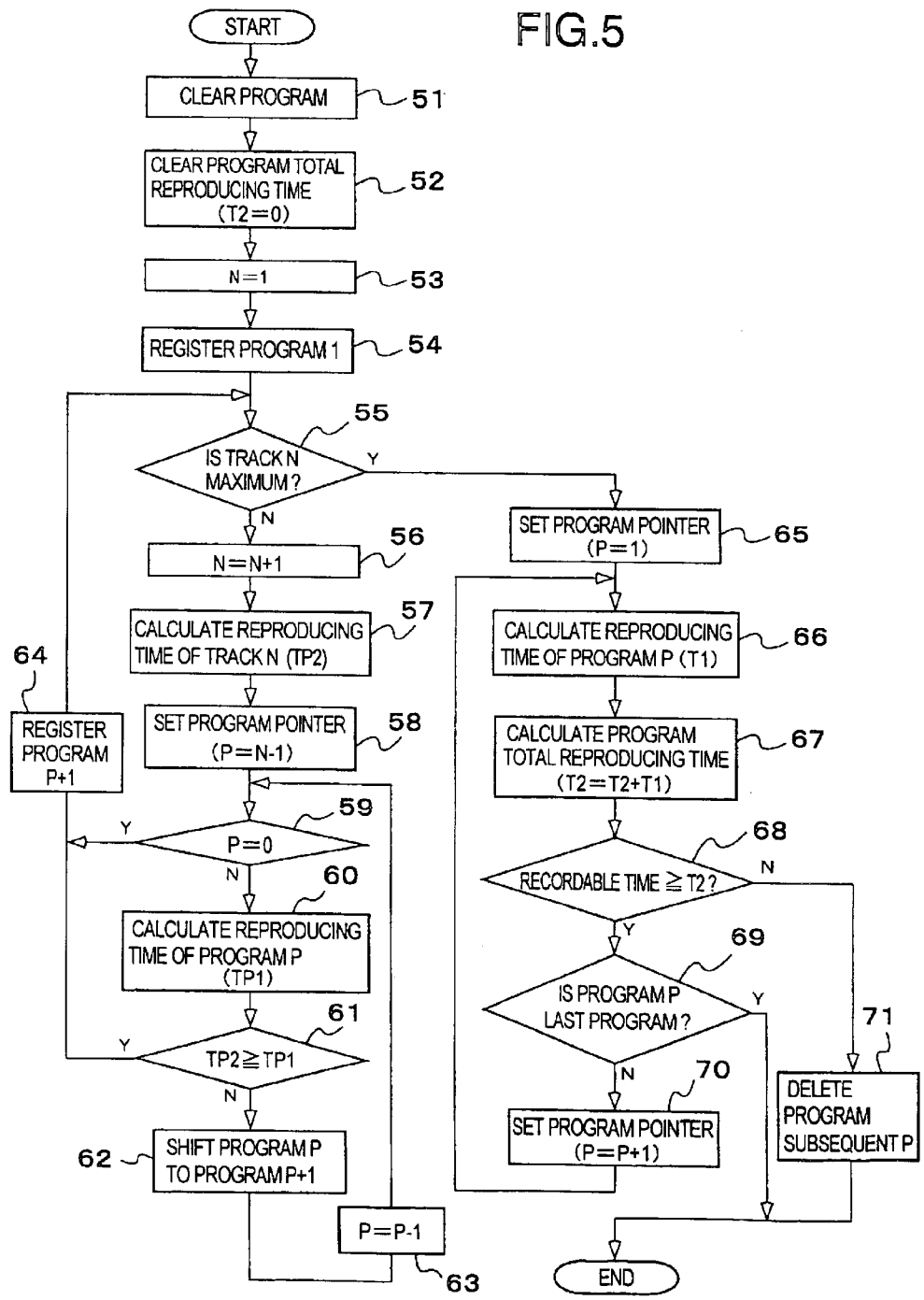
FIG. 5 is a flowchart showing a procedure of automatic edition processing according to a second embodiment of the present invention.

In this embodiment, the automatic edition processing at the step 23 of the first embodiment shown in FIG. 2, which is shown in detail in FIG. 4, has been modified as shown in FIG. 5.

That is, according to the second embodiment, in the automatic edition processing, the reproducing program is first cleared (step 51), the variable T2 representing the total reproducing time of the reproducing program is initialized to 0 (step 52) and then the variable N representing the track number corresponding to the turn of a track being noted on the CD 19 is initialized to, 1 (step 53).

Thereafter, the track of the track number N (=1) is registered in the reproducing program as the track having a program number 1 which is the first track to be reproduced (step 54), and then it is checked whether the track number N is equal to the track number of the last track recorded on thee CD 19 (step 55). If it is not the last track number, N is incremented by 1 (step 56), and the reproducing time of the track having the track number N is obatained from the TOC information of the CD 19 and substituted into TP2 (step 57). Subsequently, the variable P representing the program number of a track in the reproducing program is set to N−1 (step 58) and it is checked whether P is equal to 0 or not (step 59). If it is not equal to 0, the reproducing time of the track which has been registered as having the program number P is obtained from the TOC information of CD 19 and substituted into TP1 (step 60).

Subsequently, it is checked whether TP2 is less than TP1 (step 61). If TP2 is less than TP1, the track of the program number P in the reproducing program is re-registered as the track having the program number P+1 (step 62), and P is decremented by 1 (step 63). Thereafter, the processing returns to the step 59, and the above processing is repeated until TP2 is equal to TP1 or more (step 61) or P is equal to 0 (step 59). Thereafter, the track of the track number N is registered in the reproducing program as the (P+1)-th track having the program number (P+1) to be reproduced (step 64), and the processing returns to the step 55.

The above processing is repeated until the track number N is equal to the track number of the last track recorded on the CD 19, whereby the program numbers from the program number 1 to the program number M (=maximum track number) are allocated to all the tracks recorded on the CD 19 in the order of increasing the reproducing time, and registered in they reproducing program.

When all the tracks recorded on the CD 19 are registered in the order of increasing the reproducing time in the reproducing program as described above, P is set to 1 (step 65), the reproducing time of the track having the program number P in the reproducing program is obtained from the TOC information of the CD 19 and substituted into T1 (step 66), and then T2 is renewed to T2+T1 (step 67). Thereafter, it is checked whether T2 exceeds the recordable time which was previously obtained from the MD recorder 20 (step 68). If it does not exceed the recordable time, it is further checked whether P is equal to the maximum program number on the reproducing program (step 69). If it is not the maximum program number, P is incremented by 1 (step 70), and the processing returns to the step 66.

On the other hand, if T2 exceeds the recordable time obtained from the MD recorder 20 at step 68, the registered tracks having the program numbers subsequent to the program number P are deleted from the reproducing program (step 71), and the processing is finished. Further, if P is equal to the maximum program number on the reproducing program (step 69), the processing is finished.

As a result of the above processing, the tracks recorded on the CD 19 are selected in the order of increasing the reproducing time so that the total reproducing time of the selected tracks does not exceed the recordable time of the MD 29, and registered in the reproducing program.

Accordingly, according to this embodiment, in addition to the effect of the first embodiment, the tracks can be recorded in a manner that the maximum number of tracks can be recorded on the MD 29 within the recordable time of the MD 29.

The description of the second embodiment has been just completed.

Next, a third embodiment of the present invention will be described.

Figure 6:
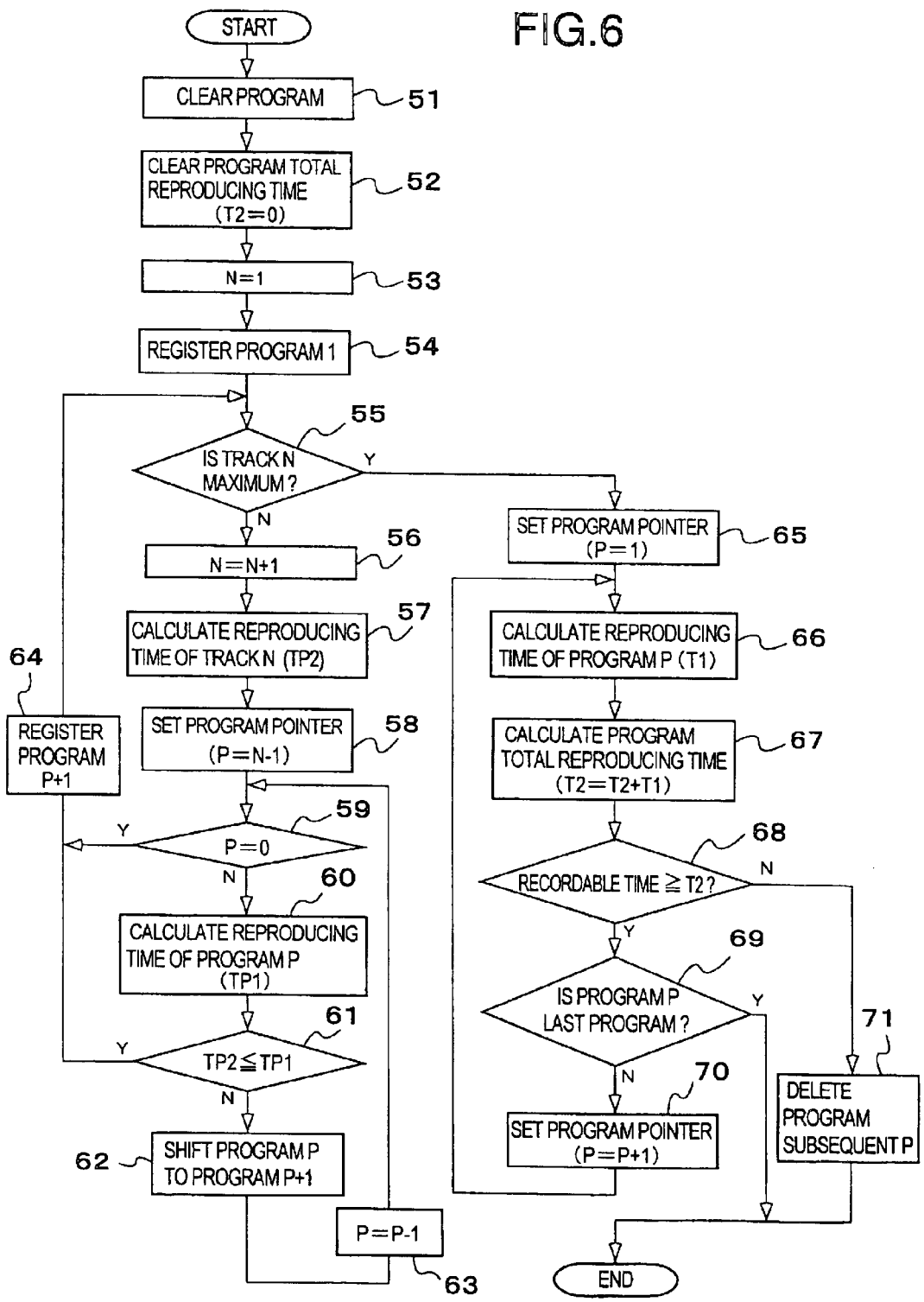
FIG. 6 is a flowchart showing the procedure of automatic edition processing according to a third embodiment of the present invention.

According to the third embodiment, the automatic edition processing at the step 23 shown in FIG. 2, which is shown in more detail in FIG. 4, has been modified as shown in FIG. 6.

In the second embodiment, the tracks are selected in the order of increasing the reproducing time from the tracks recorded on the CD 19 so that the total reproducing time of the tracks does not exceed the recordable time of the MD 29, and then recorded on the MD 29. However, in the third embodiment, tracks are selected in the order of decreasing the reproducing time from the tracks recorded on the CD 19 so that the total reproducing time of the selected tracks does not exceed the recordable time of the MD 29, and then recorded on the MD 29. Therefore, the step 61 of FIG. 5 in the second embodiment has been modified so that the processing goes to the step S62 if TP1 is less than TP2 or goes to the step 64 if TP1 is not less than TP2 as shown in the step 61 of FIG. 6.

According to this embodiment, tracks are selected in the order of decreasing the reproducing time from the tracks recorded on the CD 19 so that the total reproducing time of the tracks thus selected does not exceed the recordable time of the MD 29 and then recorded on the MD 29. Therefore, in addition to the effect of the first embodiment, there can be reduced the probability that music pieces which are long in reproducing time are excluded from the selection. Further, the tracks can be recorded on the MD 29 so that the track switching frequency in the reproducing operation of the MD 29 is reduced.

The description of the third embodiment has been just completed.

Next, a fourth embodiment of the present invention will be described.

Figure 7:
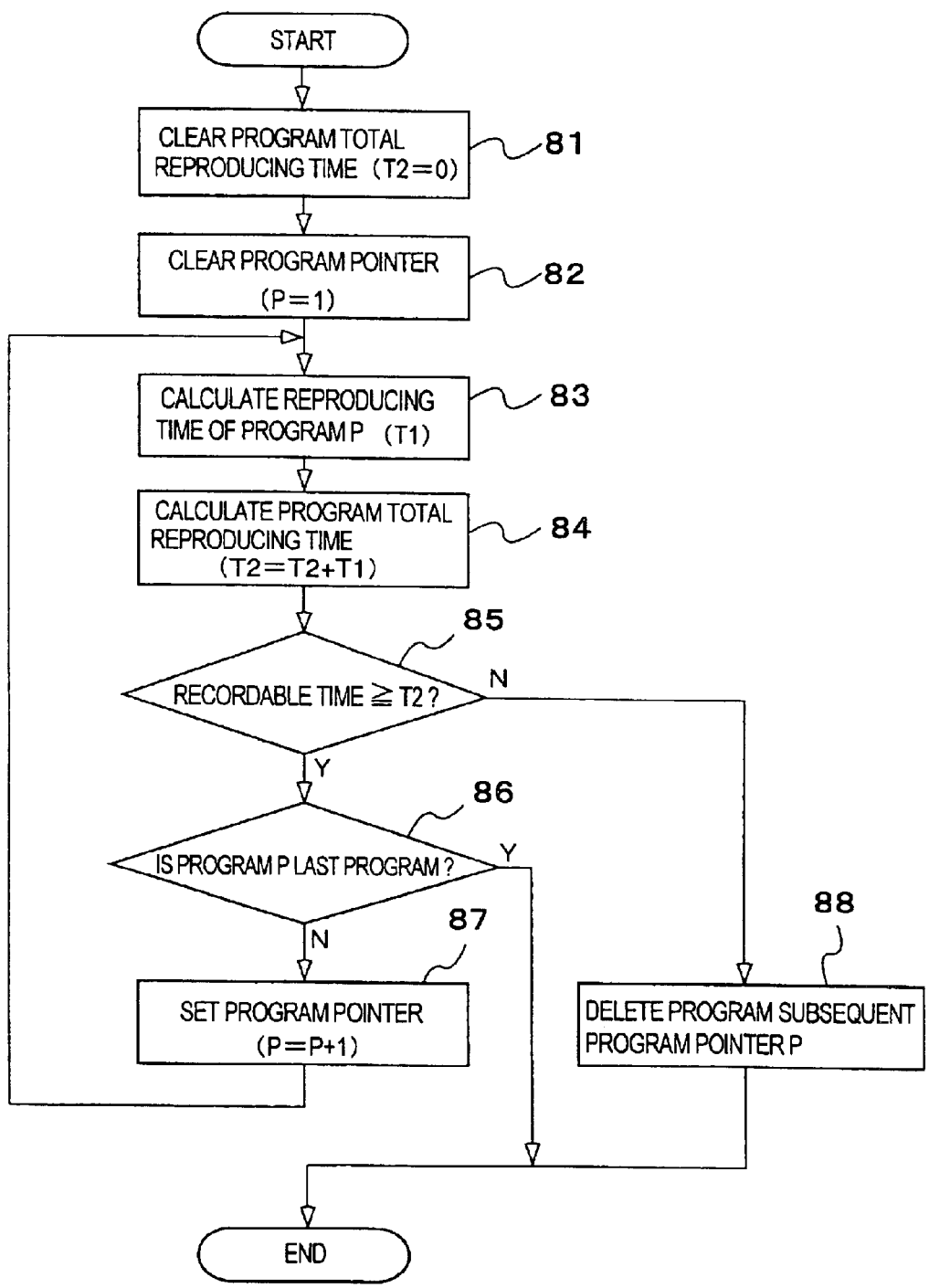
FIG. 7 is a flowchart showing a procedure of the automatic edition processing according to a fourth embodiment of the present invention.

In this embodiment, the automatic edition processing at the step 23 shown in FIG. 2 which is shown in more detail in FIG. 4 has been modified as shown in FIG. 7. Prior to start of the processing of FIG. 2, setting of the reproducing program is accepted from the user through the operating button 17 to preset the order of the program numbers in the reproducing program.

In this embodiment, T2 is first set to 0 (step 81), and P is set to 1 (step 82). The reproducing time of the track having the program number P in the reproducing program is obtained from the TOC information of the CD 19 and substituted into T1 (step 83), and then T2 is renewed to T2+T1 (step 84). Thereafter, it is checked whether T2 exceeds the recordable time obtained from the MD recorder 20 (step 85). If it does not exceed the recordable time, it is checked whether P is the last program number on the reproducing program (step 86). If it is not the last program number, P is incremented by 1 (step 87), and the processing returns to the step 83.

On the other hand, if it is judged at step 85 that T2 exceeds the recordable time obtained from the MD recorder 20, the registered tracks having the program numbers subsequent to the program number P are deleted from the reproducing program (step 88), and the processing is finished. If it is judged at the step 86 that P is equal to the maximum program number on the reproducing program, the processing is finished.

As a result of the above processing, there can be newly obtained a reproducing program in which the maximum number of tracks are selected from the tracks recorded on the CD 19 in the priority order of the program number on the reproducing program which is set by the user so that the total reproducing time of the tracks selected does not exceed the recordable time of the MD 29.

Accordingly, according to the embodiment, in addition to the effect of the first embodiment of the present invention, the tracks can be recorded on the MD 29 in the priority order set by the user so that the total reproducing time of the tracks does not exceed the recordable time of the MD 29.

The description of the fourth embodiment has been just completed.

Next, a fifth embodiment of the present invention will be described.

This embodiment is applied to the first to fourth embodiments. When some tracks which cannot be recorded on the MD 29 exist in the tracks recorded on the CD 19, these residual tracks can be recorded on another MD 29 according to the user's operation in the first to fourth embodiments by applying the fifth embodiment.

Figure 8:
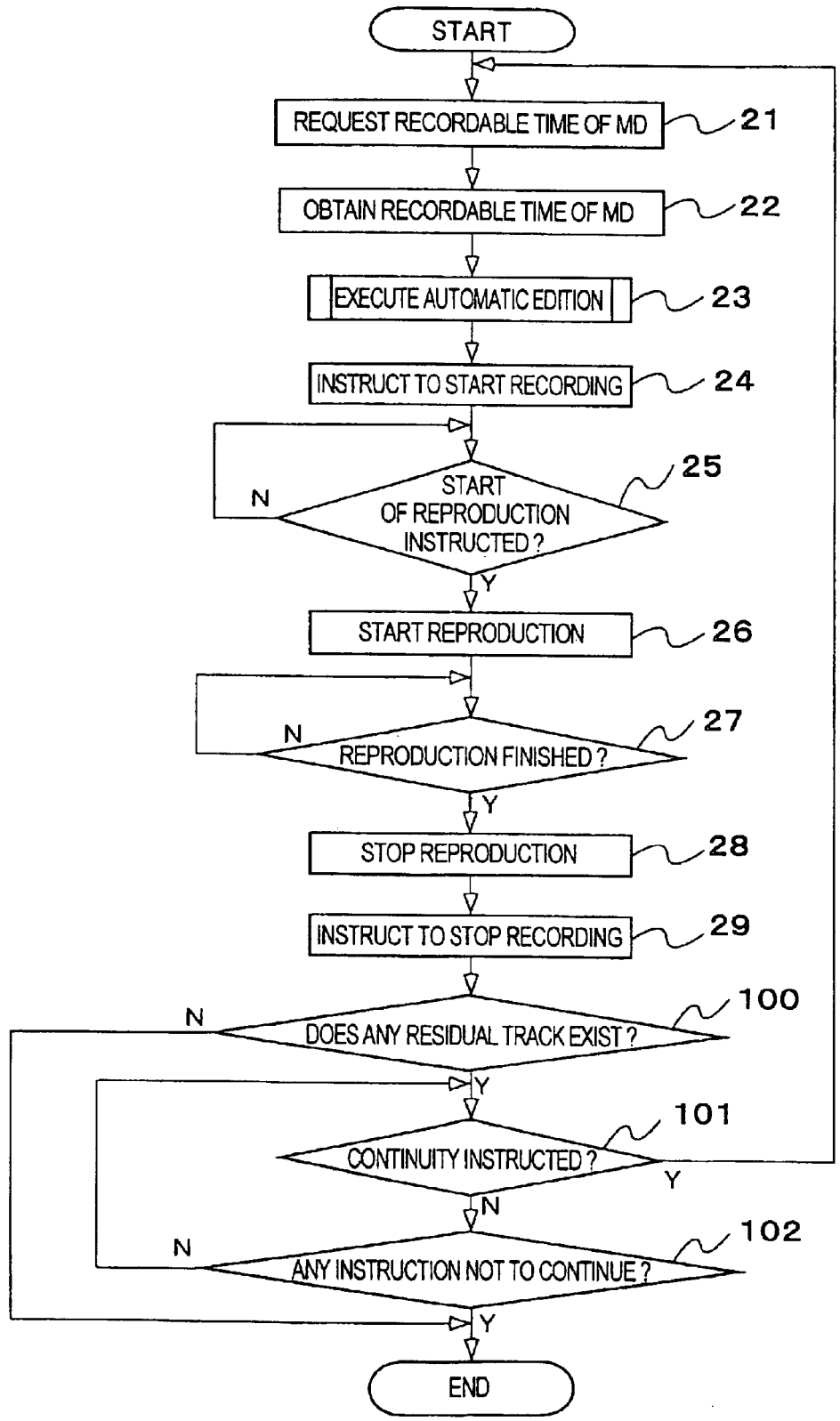
FIG. 8 is a flowchart showing an operation of automatic edition reproducing and recording of a CD player according to a fifth embodiment of the present invention.

In the fifth embodiment, as shown in FIG. 8, after the processing of the first to fourth embodiments shown in FIG. 2 (steps 21 to 29) is completed, the system controller 14 of the CD player 10 judges whether there exist any tracks out of the tracks recorded on CD 19 which could not be recorded on the MD 29 (step 100). If any residual track exists, the system controller 14 waits for input of instructions of the continuous automatic edition recording operation from the user through the operating button 17 (step 101). If instructions not to carry out the continuous automatic edition recording operation are clearly or silently made, the processing is finished with taking no action (step 102).

On the other hand, if the user exchanges the MD 29 in the MD recorder 20 for another and inputs instructions to carry out the continuous automatic edition recording operation, the processing returns to the step 21 to carry out the processing of the first to fourth embodiments (steps 21 to 29) shown in FIG. 2 on the residual tracks which could not be recorded on MD 29. The above processing is repeated until all the residual tracks have been recorded on the another MD 29 or a clear or silent instruction to stop the continuous automatic edition recording operation is made from the user (step 102).

The automatic edition processing of the step 23 on the residual tracks which could not be recorded on the MD 29 is carried out as follows.

That is, when the fifth embodiment is applied to the first embodiment, for example, in the automatic edition processing of FIG. 4, the last track number registered in the reproducing program is stored as the recorded last track number into the memory of the system controller 14. Further, in the step 43, N is not set to 1, but set to the recorded last track number+1. However, the recorded last track number is initialized to 0 when the apparatus is started, for example, the apparatus is powered on or the like.

Further, at the step 100, whether there exists any residual track which could not be recorded on the MD 29 is judged on the basis of the judgement as to whether the continuous start track number N is equal to the last track number of the CD 19. If there is no residual track, the recorded last track number is initialized to 0. If at step 102 it is clearly or silently instructed not to carry out the continuous automatic edition recording operation by the user, the recorded last track number is initialized to 0.

When the fifth embodiment is applied to the second and third embodiments, in the step 71 of FIGS. 5 and 6, the portion subsequent to the program number P to be deleted from the reproducing program is stored as a continuous automatic edition recording program starting from a program number 1 in the memory of the system controller 14. If it is judged at step 69 that P is the last program number on the reproducing program, the continuous automatic edition recording program is deleted. In the automatic edition processing, if any continuous automatic edition recording program exists, only the processing subsequent to the step 65 of FIGS. 5 and 6 is carried out with the continuous automatic edition recording program set as a reproducing program.

In step 100, by judging whether any continuous automatic edition recording program exists, it is judged whether any residual track which could not be recorded on the MD 29 exits or not. If at step 102 it is clearly or silently instructed by the user that the continuous automatic edition recording operation should not be carried out, the continuous automatic edition recording program is deleted.

When the fifth embodiment is applied to the fourth embodiment, at the step 88 of FIG. 7 for example, the portion subsequent to the program number P to be deleted from the reproducing program is stored as a continuous automatic edition recording program. If it is judged at step 86 that P is the maximum program number on the reproducing program, the continuous automatic edition recording program is deleted. In the automatic edition processing, if any continuous automatic edition recording program exists, the reproducing program is rewritten into the continuous automatic edition recording program and then the processing is carried out.

At step 100, by judging whether any continuous automatic edition recording program exists, it is judged whether any residual track which could not be recorded on the MD 29 exists or not. If at step 102 it is clearly or silently instructed by the user that no continuous automatic edition recording operation should be carried out, the continuous automatic edition recording program is deleted.

As described above, according to this embodiment, in addition to the effects of the first to fourth embodiments, when all of the tracks recorded on the CD 19 cannot be perfectly recorded on the MD 29, these tracks may be divided and recorded into plural MDs 29.

The description of the respective embodiments of the present invention have been just completed.

In each of the above-described embodiments, the audio information reproduced from the CD 19 is recorded on the MD 29, however, the embodiments is applicable to various kinds of recording media other than MD.

Further, the audio system of the present invention may be designed so that it is dependent on user's discretion which automatic edition processing of the first to fourth embodiments should be used.

As described above, according to the present invention, tracks can be automatically selected from plural tracks recorded on a recording medium serving as a source and recorded on another recording medium serving as a target so that the total reproducing time of the tracks thus selected is within the recordable time of the recording medium serving as the target even when the user does not designate any recordable time.

Further, tracks to be recorded on a recording medium serving as a target can be automatically selected from plural tracks recorded on a recording medium serving as a source in the priority order in view of the using manner of the recording medium serving as the target by the user.

What is claimed is:

1. An audio system having an audio reproducing device and an audio recording device, said audio reproducing device reproducing tracks each serving as a unit of audio information from a recording medium serving as a source mounted on said audio reproducing device as tracks to be recorded on a recording medium serving as a target mounted on said audio recording device, and said audio recording device recording the tracks reproduced by said audio reproducing device on said recording medium serving as the target, wherein:

said audio recording device comprises:
calculating means for calculating a recordable time of said recording medium serving as the target; and
notifying means for notifying said recordable time calculated by said calculating means to said audio reproducing device, and said audio reproducing device comprises:
selecting means for selecting a maximum number of tracks from tracks recorded on said recording medium serving as the source in accordance with priority order of tracks settled under a predetermined condition so that a total reproducing time of the selected tracks does not exceed said recordable time notified from said audio recording device; and
reproducing means for reproducing the tracks selected by said selection means as tracks to be recorded on said recording medium serving as the target.

2. An audio system as claimed in claim 1, wherein when any residual tracks which were not selected in said priority order in the previous selecting operation exists on said recording medium serving as the source, said selecting means selecting a maximun number of tracks from the residual tracks in said priority order so that a total reproducing time of the tracks thus selected does not exceed a recordable time which is newly notified from said audio recording device, and then has the selected tracks reproduced by said reproducing means.

3. An audio system as claimed in claim 1, wherein said predetermined condition is a condition for determining the priority order so that a track having a shorter reproducing time has a higher priority.

4. An audio system as claimed in claim 1, wherein said predetermined condition is a condition for determining the priority order so that a track having a longer reproducing time has a higher priority.

5. An audio system as claimed in claim 1, wherein said predetermined condition is a condition for determining the priority order so that a track which was more precedently recorded on said recording medium serving as the source has a higher priority.

6. An audio system as claimed in claim 1, wherein said audio reproducing device further comprises:
accepting means for accepting designation of priority order of the respective tracks recorded on the recording medium serving as the source, and said priority order of the tracks settled under the predetermined condition is said priority order accepted by said accepting means.

7. An audio system as claimed in claim 1, wherein said recording medium serving as the source is a CD (compact disc), and said recording medium serving as the target is an MD (mini disc).

* * * * *